United States Patent
Holley, Jr.

(10) Patent No.: US 6,703,590 B1
(45) Date of Patent: Mar. 9, 2004

(54) BOTTLE WARMER FOR DISPOSABLE BABY BOTTLE

(75) Inventor: James W. Holley, Jr., Colorado Springs, CO (US)

(73) Assignee: Insta-mix, Inc., Colorado Springs, CO (US)

( * ) Notice: Subject to any disclaimer, the term of this patent is extended or adjusted under 35 U.S.C. 154(b) by 0 days.

(21) Appl. No.: 10/361,123

(22) Filed: Feb. 5, 2003

(51) Int. Cl.$^7$ ................................................. A47J 36/26
(52) U.S. Cl. ........................ 219/432; 219/433; 126/265
(58) Field of Search ................................ 219/386, 432, 219/433; 126/265

(56) References Cited

U.S. PATENT DOCUMENTS

| | | | | |
|---|---|---|---|---|
| 2,277,605 A | * | 3/1942 | Palitzsch | .................... 219/436 |
| 2,843,719 A | * | 7/1958 | Smith et al. | ................. 219/429 |
| 3,152,245 A | | 10/1964 | Litman | |
| 3,804,076 A | * | 4/1974 | Fant et al. | .................... 219/432 |
| 4,699,123 A | | 10/1987 | Zaborowski | |
| 5,685,447 A | * | 11/1997 | Springett et al. | ........... 215/386 |

* cited by examiner

Primary Examiner—Joseph Pelham
(74) Attorney, Agent, or Firm—Bever, Hoffman & Harms, LLP; Patrick T. Bever

(57) ABSTRACT

A bottle warmer for warming a beverage (e.g., baby formula or milk) stored in a disposable baby bottle assembly including a disposable liner supported in a hollow sleeve (holder). The bottle warmer includes a heat transfer element that enters a lower opening of the bottle sleeve and contacts the liner. In one embodiment, the heat transfer element includes a cylindrical wall that slides between the sleeve wall and the liner to facilitate faster heating. The bottle warmer also includes a portable (e.g., gas or electric) heat generating system that heats the heat transfer element, which in turn heats a beverage stored in the liner.

20 Claims, 2 Drawing Sheets

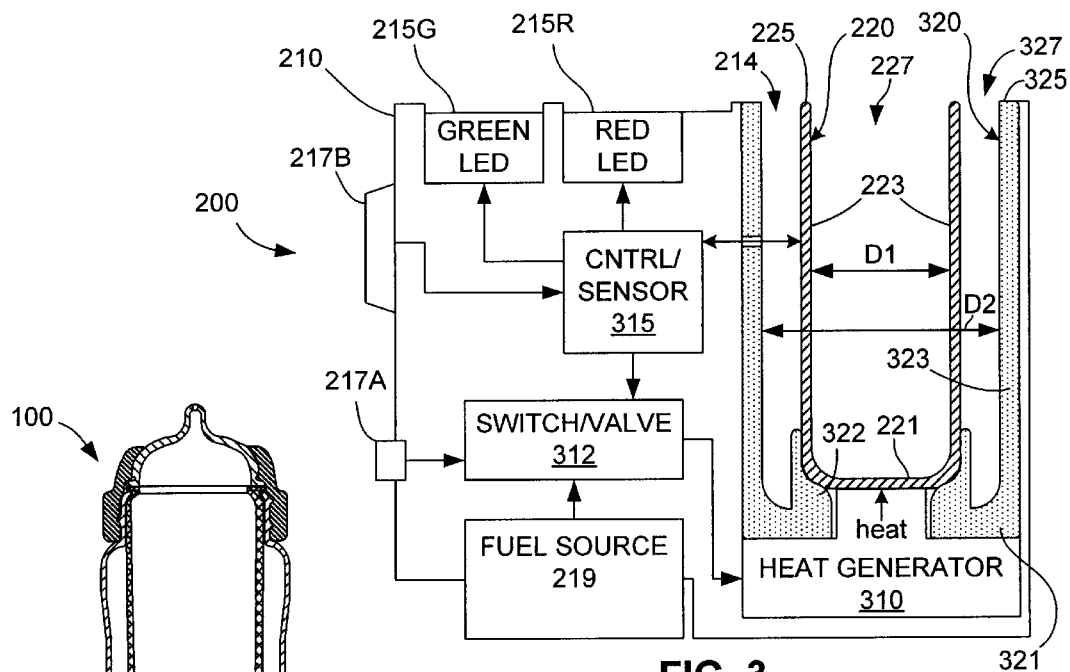
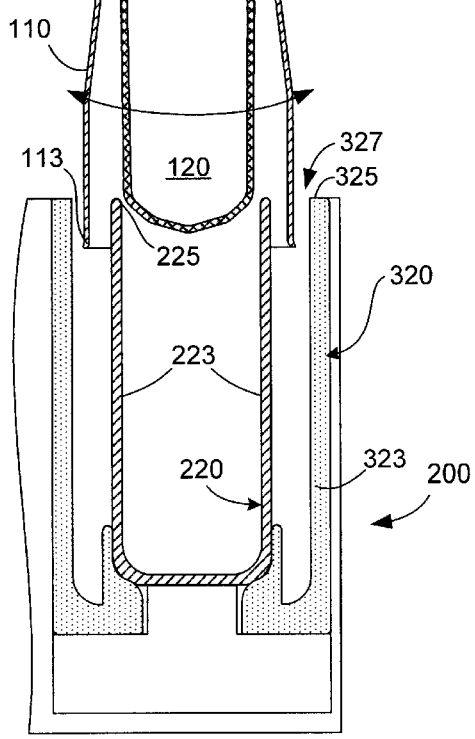
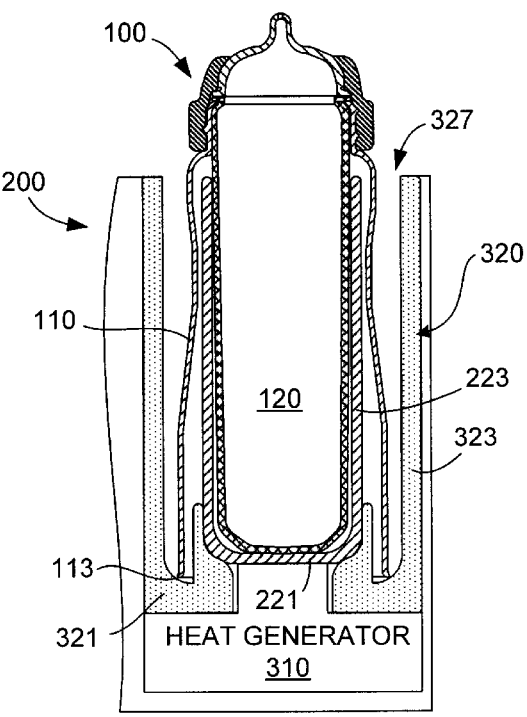
FIG. 3
FIG. 4(A)
FIG. 4(B)

BOTTLE WARMER FOR DISPOSABLE BABY BOTTLE

FIELD OF THE INVENTION

The present invention relates to apparatus for warming beverages stored in a bottle, and more particularly to a warmer for use with nursing bottles of the type utilizing disposable inner liners.

RELATED ART

FIG. 1 is an exploded perspective view showing a disposable baby bottle assembly 100 of a type including a bottle sleeve (holder) 110 and a disposable inner liner 120 that fits inside of sleeve 110, and is held in place by a cap 130. Sleeve 110 is a substantially cylindrical, hollow structure that is typically molded from a relatively stiff plastic. Sleeve 110 includes a substantially cylindrical outer wall 111 having a ring-shaped lower edge 113 defining a lower opening 114, and a threaded upper edge 115 defining an upper opening 116. Outer wall also defines an optional longitudinal slot 117 for receiving a slidable support member (not shown) therein. Liner 120 typically includes a pliable (e.g., plastic) bag or sac for storing a beverage (e.g., milk or baby formula), and in some instances is preformed to facilitate insertion into sleeve 110. Liner 120 includes an open edge 122 and a bag-like body 125 that is typically inserted through upper opening 116 of sleeve 110 until open edge 122 rests on upper edge 115 of sleeve 110. Cap 130 is a substantially ring-shaped structure that is molded from relatively stiff plastic, and includes threads (not shown) that mate with upper edge 115 of sleeve 110. A rubber or plastic nipple 140 is typically mounted onto cap 130. When assembled, a lip of cap 130 pinches open edge 122 of liner 120 and a lower edge (not shown) of nipple 140 against upper edge 115 of sleeve 110, thereby forming a substantially enclosed beverage chamber defined by liner 120 and nipple 140. Subsequently, as beverage is sucked out of liner 120 through an opening formed in nipple 140, liner 120 collapses inside of sleeve 110. After use, liner 120 is typically discarded, and sleeve 110, cap 130, and nipple 140 are typically washed and reused. Disposable nursers similar to disposable baby bottle assembly 100 are sold by Playtex Products Inc. of Westport, Conn., USA.

The milk and baby formula typically dispensed using disposable baby bottle assembly 100 are preferably consumed warm (i.e., above average room temperature). The heating method recommended by disposable baby bottle manufacturers is to hold the assembly 100 under hot tap water, or to place assembly 100 into a pan of warm water removed from heat source. Alternatively, these manufacturers recommend heating the beverage outside of liner 120, and then pouring into liner 120 after cooling to a safe temperature. Liner manufacturers typically warn against using a direct heat source to heat a beverage stored in a liner due to the danger of overheating the beverage and bursting the liner.

While performing the recommended heating methods (e.g., hot tap water or warm water bath) is relatively convenient at home, such methods are typically not available when traveling. Moreover, heating the beverages outside of the liners is typically difficult when traveling, and may present a dangerous health risk by exposing the beverages to, contaminants while pouring the beverage into the liner. Consequently, beverages are often consumed from disposable baby bottles at an undesirable (e.g., room) temperature.

What is needed is an apparatus that quickly and safely warms beverages stored in disposable baby bottles to a desirable temperature.

SUMMARY

The present invention is directed to a bottle warmer for warming a beverage (e.g., baby formula or milk) stored in a disposable baby bottle assembly. The bottle warmer includes a housing having an opening for receiving the bottom edge of the baby bottle, a heat transfer element located inside of the opening that contacts the liner when the baby bottle sleeve is fully inserted into the housing, and a heat generator coupled to the heat transfer element such that heat is transferred to the liner at a preset rate and temperature, thereby safely and reliably heating the stored beverage without danger of overheating the beverage and/or bursting the liner wall.

In accordance with an embodiment of the present invention, the heat transfer element of the bottle warmer includes a cup-shaped container having a closed bottom wall, and a cylindrical outer wall that extends upward from the bottom wall and has a circular upper edge that defines an upper opening. The cup-shaped container is formed from a thermally conductive material such as stainless steel, aluminum or other metal, and may be coated with a non-stick material. The cup-shaped container is mounted in the bottle warmer housing over the heat generator such that, when the bottle assembly is mounted onto the bottle warmer, the upper edge of the heat transfer element slides between the sleeve wall and the liner, and the liner is inserted inside the cup-shaped container. When fully inserted, the liner rests against the bottom wall of the heat transfer element, and portions of the liner contact the cylindrical wall of the heat transfer element. By interposing the cylindrical wall of the heat transfer element between the sleeve and the liner in this manner, heat is efficiently transferred from the heat transfer element to the beverage without having to pass through the sleeve wall. Further, this arrangement maximizes surface contact between the cup-shaped heat transfer element and the beverage-filled liner inserted therein, thereby facilitating the even distribution of heat to the liner to reduce heating time and the danger of local "hot spots".

In accordance with another embodiment of the present invention, a plastic or ceramic insert is mounted in the bottle warmer housing that supports the heat transfer element over the heat generator. The insert includes a donut-shaped bottom wall having a mounting structure formed thereon for holding the bottom wall of the heat transfer element, and a cylindrical outer wall that extends upward from the bottom wall and has a circular upper edge that defines an upper opening. A cylindrical groove is formed between the cylindrical wall of the heat transfer element, which has a relatively small diameter, and the cylindrical wall of the insert, which has a relatively large diameter.

In accordance with yet another embodiment of the present invention, a system is provided that includes a baby bottle warmer and a disposable baby bottle assembly in which the baby bottle sleeve and/or the bottle warmer are provided with a mechanism that turns the sleeve while the disposable baby bottle assembly is pushed into the bottle warmer, thereby causing the liner to slide on the surface of the heat transfer element to prevent sticking.

In accordance with another aspect of the present invention, the heat generator is a portable heat generating system that is powered by a fuel source mounted in the housing of the bottle warmer. In one embodiment, the heat generating system includes a valve and/or control switch, a heat generator, and a removable fuel source. The heat generator is mounted in the bottle warmer housing and located below the cup-shaped heat transfer element. In one specific embodiment, the heat generating system is a combustible gas burning system including a valve assembly for passing a combustible gas (e.g., butane) from a removable container to a gas-burning mechanism. A second manual switch is provided to initiate gas flow from container to the gas-burning mechanism, and the manual ON/OFF switch is used to facilitate ignition of the gas. The gas-burning mechanism includes a ceramic piece that is heated by the small gas flame, and is connected to the heat transfer element such that the heat transfer element acts as a heat sink for the ceramic piece. In accordance with a second embodiment, an electrical heating system includes a switch for passing an electric current from a removable battery to a resistive heating element.

The present invention will be more fully understood in view of the following description and drawings.

BRIEF DESCRIPTION OF THE DRAWINGS

FIG. 3 is a simplified cross-sectional side view showing the bottle warmer of FIG. 2; and FIGS. 4(A) and 4(B) are simplified cross-sectional side view showing a conventional disposable baby bottle as it is mounted into the bottle warmer of FIG. 3.

DETAILED DESCRIPTION

Figure 1:
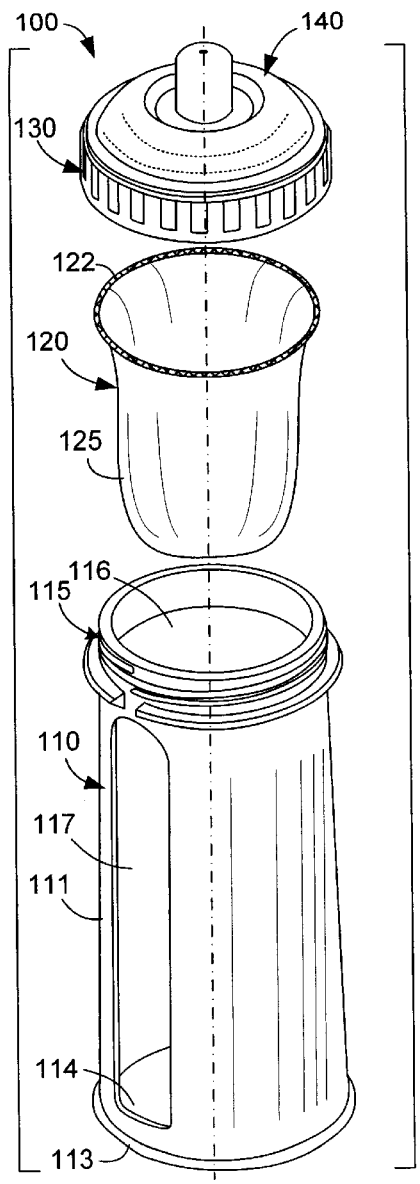
FIG. 1 is an exploded perspective view showing a conventional disposable baby bottle assembly.
Figure 2:
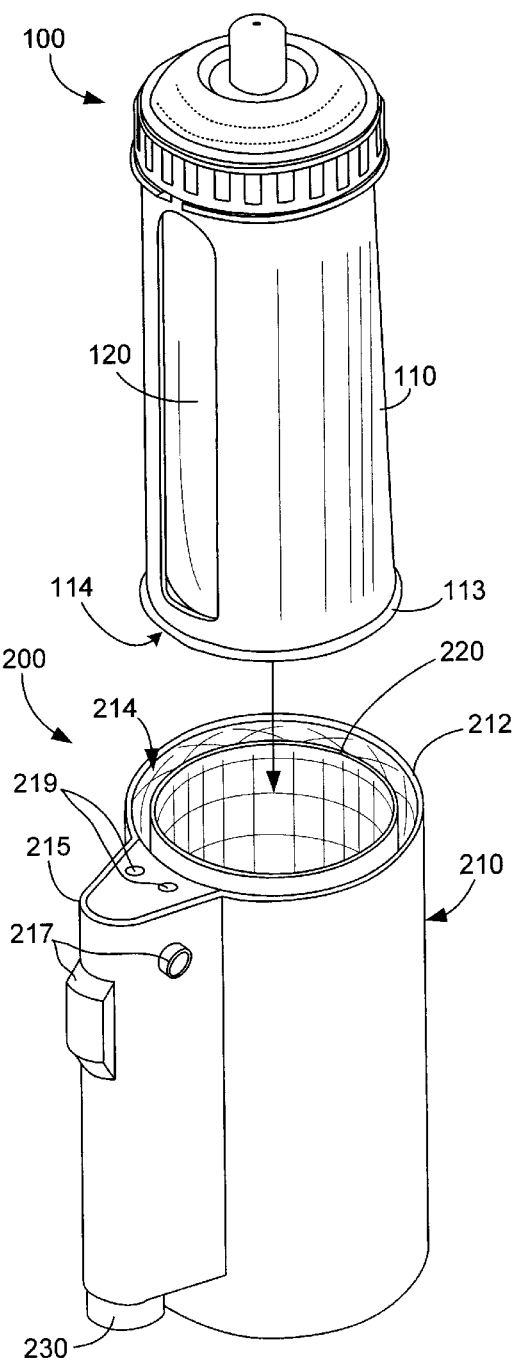
FIG. 2 is an exploded perspective view showing a system including a conventional disposable baby bottle being mounted into a bottle warmer produced in accordance with an embodiment of the present invention.

FIG. 2 is an exploded perspective view showing a system including a bottle warmer 200 for warming a beverage (e.g., baby formula or milk) stored in disposable baby bottle assembly 100 (described above with reference to FIG. 1) in accordance with an embodiment of the present invention. Although the present invention is described below in the context of a portable unit for warming the contents of a disposable baby bottle, the present invention may be modified and/or utilized to heat or warm the contents of other container types that utilize a storage liner similar to that described above with reference to disposable baby bottle assembly 100.

In the embodiment shown in FIG. 2, bottle warmer 200 includes a housing 210, a heat transfer element 220 mounted in housing 210, and a heat generator (not shown) also mounted in housing 210 and positioned below heat transfer element 220.

Housing 210 includes a substantially cylindrical wall 212 that defines an upper (first) opening 214. The diameter of opening 214 is larger than the diameter of lower edge 113 of bottle sleeve 110 such that disposable baby bottle assembly 100 can be inserted into housing 210 through opening 214. Housing 210 also includes a protrusion 215 for controlling a heat generating system (discussed below), which is mounted in housing 210 such that the heat generating system selectively transfers heat to heat transfer element 220. Manual control switches 217 and optional indicator lights 219 are provided on protrusion 215 to facilitate control of bottle warmer 200 in the manner described below. Housing 210 also includes an opening (not shown) for receiving a fuel cell 230 (e.g., a gas canister or a battery), which is partially shown in the lower portion of FIG. 2.

Heat transfer element 220 and the heat generator (not shown) are mounted inside housing 210 such that heat transfer element 220 is exposed through opening 214, and is positioned relative to opening 214 such that, when disposable baby bottle assembly 100 is inserted into opening 214, heat transfer element 220 extends through lower opening 114 of sleeve 110 and contacts a lower end of liner 120. As discussed in additional detail below, heat transfer element 220 is formed from a rigid, thermally conductive material (e.g., stainless steel), and is coupled to the heat generator such that heat generated by the heat generating system is transferred to heat transfer element 220, which is turn passes the heat to liner 120.

FIG. 3 is a simplified diagram showing bottle warmer 200 in additional detail. In addition to housing 210, heat transfer element 220 and fuel source 230, bottle warmer 200 includes a heat generator 310 and an optional insert 320, which are described in additional detail below.

According to the specific embodiment shown in FIG. 3, heat transfer element 220 comprises a cup-shaped container having a closed bottom wall 221, and a cylindrical wall 223 that extends upward from bottom wall 221 and has a circular upper edge 225 that defines an upper opening 227. As discussed further below, cylindrical wall 223 has a diameter D1 that is smaller than the diameter of the baby bottle sleeve. Heat transfer element 220 is formed from a thermally conductive material such as stainless steel or other metal, and may be coated with a non-stick material. The inventor believes that the further cylindrical wall 223 extends into sleeve 110, the faster beverages stored in liner 120 are heated (i.e., due to the greater surface contact between liner 120 and cylindrical wall 223). However, a beneficial structure may also be provided using a shorter cylindrical wall 223, or no cylindrical wall at all (i.e., only bottom wall 221 that extends through lower opening 114 to contact the bottom of liner 120). Therefore, unless specified, the appended claims are not intended to be limited to the structure shown in the figures.

A heat generator 310 is mounted in bottle warmer housing 210 below lower wall 221 of heat transfer element 220. In one embodiment, heat generator 310 is a portable combustible gas burning system including a valve assembly (valve/switch) 312 for passing a combustible gas (e.g., butane) from a removable container (fuel source 230) to a gas-burning mechanism (heat generator) 310. A switch 217A is provided to initiate gas flow from container 230 to gas-burning mechanism 120, and ON/OFF switch 217B facilitates ignition of the gas to produce a small gas flame in gas-burning mechanism 310. A controller/sensor 315 is provided to control the heating process by, for example, limiting heat generation to a predetermined period of time, or by sensing the temperature of heat transfer element 220. Gas-burning mechanism 310 includes a ceramic piece that is heated by the small gas flame, and is connected to bottom wall 221 of heat transfer element 220 such that heat transfer element 220 acts as a heat sink for the ceramic piece. A suitable combustible gas burning system is disclosed in U.S. Pat. No. 4,699,123, entitled "Portable Heating Appliance".

In accordance with an alternative second embodiment, an electrical heating system includes a switch 217B for passing an electric current from a removable battery (fuel source) 230 to a resistive heating element (heat generator) 310.

Optional insert 320 is mounted inside housing 210, and includes a donut-shaped bottom wall 321, a mounting structure 322 formed on the donut-shaped bottom wall, a cylindrical outer wall 323 extending upward from the bottom wall and having a circular upper edge 325 that defines an upper opening (groove) 327. Mounting structure 322 is located inboard of cylindrical outer wall 323, and is formed to receive and secure bottom wall 221 of heat transfer element 220. Cylindrical outer wall 323 defines an inside diameter D2 that is larger than outside diameter D1 of heat transfer element 220, and is also larger than the outer diameter of the baby bottle sleeve. Accordingly, cylindrical groove 327 is formed between cylindrical outer wall 323 of insert 320 and cylindrical wall 223 of heat transfer element 220. In one embodiment, insert 320 is molded or otherwise formed from suitable plastic or ceramic materials.

According to another embodiment (not shown), the features of insert 320 may be integrally incorporated into housing 210 using known molding techniques.

The operation of bottle warmer 200 will now be described with reference to FIGS. 4(A) and 4(B), which are partial views taken from FIG. 3.

Prior to operation, a room temperature or cold beverage is stored in liner 120 of bottle assembly 100, and liner 120 is mounted in sleeve 110 as indicated in FIG. 4(A). Bottle assembly 100 is manually positioned over bottle warmer 200 such that liner 120 is aligned with upper edge 225 of heat transfer element 220 and lower edge 113 of sleeve 110 is aligned over groove 327 formed between cylindrical outer wall 323 of insert 320 and cylindrical wall 223 of heat transfer element 220. Bottle assembly 100 is then lowered such that liner 120 enters heat transfer element 220 and lower edge 113 of sleeve 110 enters groove 327. Note that, due to possible sticking between liner 120 and heat transfer element 220, it may be necessary to manually rotate sleeve 110 (as indicated by double-headed arrow) such that liner 120 slides in a transverse direction against the inner surface of heat transfer element 220. Bottle assembly 100 is pushed downward in this manner such that upper edge 225 of heat transfer element 220 slides between sleeve 110 and liner 120. As indicated in FIG. 4(B), when bottle assembly 100 is fully inserted into bottle warmer 200, a bottom end of liner 120 rests against bottom wall 221 of heat transfer element 220, and side portions of liner 120 contact cylindrical wall 223 of heat transfer element 220. By interposing heat transfer element 220 between sleeve 110 and liner 120 in this manner, heat is efficiently transferred from heat transfer element 220 to the beverage stored in liner 120 without having to pass through sleeve 110. Further, this arrangement maximizes surface contact between heat transfer element 110 and the beverage-filled liner inserted therein, thereby facilitating the even distribution of heat to liner 120 to minimize heating time and the danger of local "hot spots".

Referring again to FIG. 3, after the bottle assembly is inserted into bottle warmer 200, the heat generating system is manually actuated using ON/OFF switch 217A and, if necessary, fuel flow switch 217B. When the heat generating system is turned on, valve/switch 312 facilitates the flow of fuel to heat generator 310, which in turn generates heat that is transferred to heat transfer element 220. In addition, an optional first indicator light (e.g., a red light emitting diode (LED)) 215R is turned on by controller 315 to indicate that heat generator 310 is working. When the beverage stored in liner 100 is subjected to heat for a predetermined period of time, or the upper portion of heat transfer element 220 reaches a predetermined temperature, controller/sensor 315 transmits a control signal to switch 312 that terminates the flow of fuel to heat generator 310. In addition, the control signal from controller/sensor 315 turns off first indicator light 217R, and turns on an optional second indicator light (e.g., a green LED) 217G, thereby notifying the user that the bottle contents are at a temperature suitable for consumption. By automatically controlling the heating process in this manner, bottle warmer 200 facilitates safe and reliable heating of beverages stored disposable baby bottle assemblies.

Other modifications to the disclosed apparatus are also possible. For example, to facilitate turning (twisting) of the bottle sleeve during insertion into the bottle warmer, a modified system may provide a mechanism that turns the sleeve while the disposable baby bottle assembly is inserted into the bottle warmer, thereby facilitating insertion of the liner into the cup-shaped heat transfer element. In one possible embodiment, a set of teeth may extend from the outer surface of the sleeve that engage with helical grooves (threads) formed in the insert portion of the bottle warmer. As the bottle is inserted, engagement between the teeth and the helical grooves cause the sleeve to turn, thereby twisting the liner relative to the stationary cup-shaped heat transfer element. In another alternative embodiment, a non-portable heat generating system (e.g., an electric heater powered by normal household currents and a standard plug arrangement) may be used in place of the portable heat generating systems mentioned herein. Yet other modifications are also possible. Thus, the invention is limited only by the following claims.

I claim:

1. A bottle warmer for warming a beverage stored in a disposable baby bottle assembly, the disposable baby bottle assembly including a hollow sleeve having a substantially cylindrical outer wall including a lower edge defining a lower opening, and a liner positioned inside the sleeve, the bottle warmer comprising:

a housing including an opening for receiving the lower edge of the sleeve;

a heat transfer element mounted in the opening such that when the sleeve is inserted into the opening of the housing, the heat transfer element extends through the open bottom of the sleeve and contacts the liner, and a heat generator mounted in the housing and being coupled to the heat transfer element such that heat generated by the heat generator is transmitted to the heat transfer element.

2. The bottle warmer according to claim 1, wherein the heat transfer element comprises a bottom wall, and a cylindrical wall that extends upward from the bottom wall and has a circular upper edge that define an upper opening.

3. The bottle warmer according to claim 2, wherein the heat transfer element comprises at least one of stainless steel and aluminum.

4. The bottle warmer according to claim 2, wherein the heat generator is located below the bottom wall of the heat transfer element and arranged such that heat generated by the heat generator is applied to the bottom wall.

5. The bottle warmer according to claim 2, further comprising an insert mounted in the housing, the insert including a donut-shaped bottom wall, a mounting structure formed on the donut-shaped bottom wall, a cylindrical outer wall extending upward from the bottom wall and having a circular upper edge that defines an upper opening, wherein the bottom wall of the heat transfer element is secured to the mounting structure of the insert, and wherein a first diameter defined by the cylindrical outer wall of the insert is larger than a second diameter defined by the cylindrical wall of the heat transfer element.

6. The bottle warmer according to claim 5, wherein the insert comprises at least one of ceramic and plastic.

7. The bottle warmer according to claim 2, wherein the housing comprises a substantially cylindrical wall portion surrounding the heat transfer element such that a cylindrical groove is defined between the wall portion of the housing and the cylindrical wall of the heat transfer element.

8. The bottle warmer according to claim 7, wherein the heat generator is located below a bottom wall of the heat transfer element.

9. The bottle warmer according to claim 1, wherein heat generator comprises a natural gas burning heat generator, and the bottle warmer further comprises a natural gas container.

10. The bottle warmer according to claim 1, wherein heat generator comprises a resistive heat generating element, and the portable bottle warmer further comprises a removable battery.

11. A system comprising:
- a disposable baby bottle assembly including a hollow sleeve having a substantially cylindrical outer wall including a lower edge defining a lower opening, and a liner positioned inside the sleeve; and
- a bottle warmer for warming a beverage stored in the liner of the disposable baby bottle assembly, wherein the bottle warmer includes:
  - a housing including an opening for receiving the lower edge of the sleeve,
  - a heat transfer element mounted in the opening such that when the sleeve is inserted into the opening of the housing, the heat transfer element extends through the open bottom of the sleeve and contacts the liner, and
  - a heat generator mounted in the housing and being coupled to the heat transfer element such that heat generated by the heat generator is transmitted to the heat transfer element.

12. The system according to claim 11, wherein the heat transfer element comprises a bottom wall, and a cylindrical wall that extends upward from the bottom wall and has a circular upper edge that define an upper opening.

13. The bottle warmer according to claim 12, wherein the heat transfer element comprises at least one of stainless steel and aluminum.

14. The system according to claim 12, wherein the heat generator is located below the bottom wall of the heat transfer element and arranged such that heat generated by the heat generator is applied to the bottom wall.

15. The system according to claim 12, further comprising an insert mounted in the housing, the insert including a donut-shaped bottom wall, a mounting structure formed the donut-shaped bottom wall, a cylindrical outer wall extending upward from the bottom wall and has a circular upper edge that defines an upper opening,
  - wherein the bottom wall of the heat transfer element is secured to the mounting structure of the insert, and
  - wherein a first diameter defined by the cylindrical outer wall of the insert is larger than a second diameter defined by the cylindrical wall of the heat transfer element.

16. The system according to claim 12, wherein the sleeve includes a set of teeth, and the housing comprises a substantially cylindrical wall portion surrounding the heat transfer element and defining a set of helical grooves that mate with the set of teeth such that the sleeve is rotated during insertion into the bottle warmer.

17. The system according to claim 12, wherein the housing comprises a substantially cylindrical wall portion surrounding the heat transfer element such that a cylindrical groove is defined between the wall portion of the housing and the cylindrical wall of the heat transfer element.

18. The system according to claim 17, wherein the heat generator is located below a bottom wall of the heat transfer element.

19. The system according to claim 11, wherein heat generator comprises a natural gas burning heat generator, and the bottle warmer further comprises a natural gas container.

20. The system according to claim 11, wherein heat generator comprises a resistive heat generating element, and the portable bottle warmer further comprises a removable battery.

* * * * *